(12) United States Patent
Gwag (10) Patent No.: US 10,806,324 B2
(45) Date of Patent: Oct. 20, 2020

(54) DOOR PANEL FOR HOME APPLIANCE

(71) Applicant: LG ELECTRONICS INC., Seoul (KR)

(72) Inventor: Hyoseong Gwag, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 15/862,928

(22) Filed: Jan. 5, 2018

(65) Prior Publication Data

US 2018/0184879 A1     Jul. 5, 2018

(30) Foreign Application Priority Data

Jan. 5, 2017 (KR) ........................ 10-2017-0002097

(51) Int. Cl.
    *A47L 15/42*      (2006.01)
    *F16B 5/12*      (2006.01)

(52) U.S. Cl.
     CPC .......... *A47L 15/4265* (2013.01); *F16B 5/121* (2013.01); *Y10T 403/1608* (2015.01)

(58) Field of Classification Search
     CPC ........ A47B 47/0033; A47B 2220/0063; A47L 15/4265; F16B 5/121; F16B 5/126; Y10T 24/45105; Y10T 403/15; Y10T 403/16; Y10T 403/1608; Y10T 403/1616; Y10T 403/17
     USPC ................ 403/10, 11, 12, 13, 23; 24/581.11
     See application file for complete search history.

(56) References Cited

U.S. PATENT DOCUMENTS

| | | | | |
|---|---|---|---|---|
| 3,940,893 | A * | 3/1976 | Rausch | E04B 1/6812 52/91.3 |
| 4,320,614 | A * | 3/1982 | Brezosky | E04C 2/52 52/287.1 |
| 4,966,424 | A * | 10/1990 | Schneider | F16B 12/38 312/265.6 |
| 7,322,770 | B2 * | 1/2008 | Frank | A47F 3/004 403/253 |
| 9,874,010 | B2 * | 1/2018 | Gosling | E04B 2/721 |

(Continued)

FOREIGN PATENT DOCUMENTS

| | | |
|---|---|---|
| EP | 2 465 403 | 6/2012 |
| EP | 2 520 210 | 11/2012 |
| KR | 10-2017-0006186 | 1/2017 |

(Continued)

OTHER PUBLICATIONS

European Search Report Issued in application No. 18150329.3 dated May 4, 2018.

*Primary Examiner* — Josh Skroupa
(74) *Attorney, Agent, or Firm* — KED & Associates LLP (57) ABSTRACT

A door panel includes a front surface panel, a side surface panel bent from a side of the front surface panel, an upper surface panel bent from a top of the front surface panel and provided above the side surface panel, a gap formed between the upper end of the side surface panel and the side end of the upper surface panel, and a decoration piece configured to fill the gap. The decoration piece includes an exposed portion configured to compensate for a difference in height between the upper end of the side surface panel and the upper surface panel, a side surface configured to contact the inner surface of the side surface panel, and a front surface configured to contact the inner surface of the front surface panel.

18 Claims, 6 Drawing Sheets

(56) References Cited

U.S. PATENT DOCUMENTS

2017/0159351 A1* 6/2017 Kim .................... A47L 15/4265
2017/0175786 A1 6/2017 Gwag et al.

FOREIGN PATENT DOCUMENTS

WO   WO-2016041597 A1 * 3/2016  ............. E04B 2/723
WO   WO 2017/007150      1/2017

* cited by examiner

DOOR PANEL FOR HOME APPLIANCE

CROSS-REFERENCE TO RELATED APPLICATION(S)

This application claims the benefit of Korean Patent Application No. 10-2017-0002097, filed in Korea on Jan. 5, 2017, which is hereby incorporated by reference as if fully set forth herein.

BACKGROUND

1. Field

The present invention relates to a door panel that is used in a home appliance.

2. Background

A cabinet or a door of a home appliance may be formed by performing a sheet-metal working process on a metal sheet material. In other words, a plurality of surfaces may be formed on a piece of sheet material through a sheet-metal working process. A bent portion of the sheet material, which may be a boundary between one surface and another surface, may be continuously formed. However, a vertex, at which three surfaces meet, or an edge, at which two surfaces meet after being bent, may inevitably be formed in a discontinuous manner.

A gap formed between the discontinuous surfaces may be filled by a welding process or the like, or may remain unfilled. When the gap formed between the discontinuous surfaces is exposed outside, it is common to fill the gap. When the gap formed between the discontinuous surfaces is not exposed outside, it is common not to fill the gap.

A cabinet or a door made of a metal material is commonly used presently. In particular, a door panel, which may be made of a metal material, specifically stainless steel, may be mainly used for home appliances, such as washing machines, refrigerators, dishwashers, etc. The door panel may be configured to be exposed outside.

However, it is very inconvenient to perform a welding process in order to fill a gap formed between discontinuous surfaces in the door panel. In addition, a finishing process, such as polishing, needs to be performed after the welding process. In spite of the finishing process, the color or texture of the welded portion may not harmonize with that of the remaining portion, thus deteriorating the aesthetic appearance of a product.

An insertion unit for filling such a gap is disclosed in Korean Patent Application No. 10-2015-0096741, filed by the present applicant. The insertion unit may be configured to be inserted into a gap in a panel from outside the panel in order to fill the gap. However, when the gap is small, it may not be easy to apply this insertion unit. This is because a structure for fixing the insertion unit after insertion of the insertion unit fails to properly function due to a decrease in the size of the insertion unit.

Therefore, there is a need for an insertion unit or a decoration unit capable of effectively filling a relatively small gap. In particular, such a decoration unit needs to have a configuration that can be easily mounted. In addition, there is a need for a door panel that exhibits an improved aesthetic appearance and that has a configuration in which a decoration unit fills a gap more reliably.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
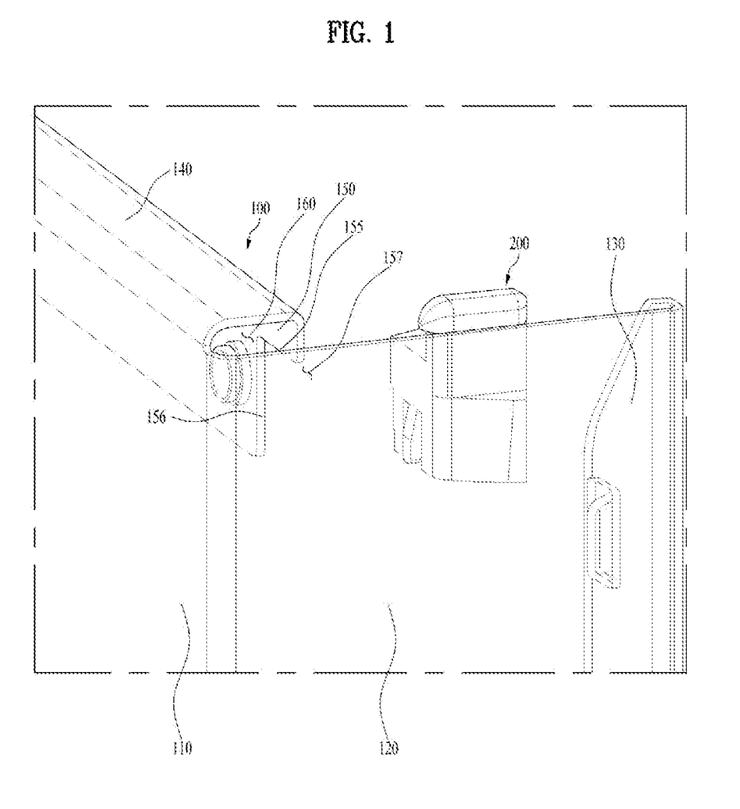
FIG. 1 illustrates a door panel according to an embodiment of the present disclosure before a decoration unit is inserted thereinto.

Referring to FIG. 1, a door panel 100 may include a front surface panel 110, a side surface panel 120, and an upper surface panel 140. These panels may be formed using a single panel. The side surface panel 120 may be formed at each of the left and right sides of the front surface panel 110.

The side surface panel 120 may be formed at the side of the front surface panel 110 through a bending process, and the upper surface panel 140 may be formed at the top of the front surface panel 110 through a bending process. The connecting portion between the panels may be rounded via the bending process, and the panels may be stepped from each other by this round connecting portion between the panels.

For example, when the upper surface panel 140 is bent from the top of the front surface panel 110 such that a round connecting portion is formed between the upper surface panel 140 and the front surface panel 110, the upper surface panel 140 and the side surface panel 120 may be stepped from each other in the vertical direction. In addition, when the side surface panel 120 is bent from the side of the front surface panel 110 such that a round connecting portion is formed between the side surface panel 120 and the front surface panel 110, the side surface panel 120 and one side end of the upper surface panel 140 may be stepped from each other in the horizontal direction.

The vertically and horizontally stepped arrangement of the upper surface panel 140 and the side surface panel 120 may form a gap therebetween. Therefore, the cut surface of the door panel 100, i.e. the upper-end surface of the side surface panel 120 or the side-end surface of the upper surface panel 140, may be exposed outside through the gap.

The door panel 100 may be formed through processes of cutting and bending the single piece of panel. Therefore, the aforementioned gap may be a spatially discontinuous section between the panels, and thus the cut surface of the door panel 100 may be exposed outside through the gap. Because the cut surface of the door panel 100, which may be made of a metal material, may be very sharp, unless appropriate finishing treatment is applied to the cut surface, this entails the risk of injuring a user. Even when finishing treatment is applied to the cut surface, because the cut surface has a small thickness, there may still be a risk of injuring a user.

The embodiment may provide a decoration unit or decorative piece 200 that fills a gap 160 formed between the panels. The decoration unit 200 may prevent the cut surface from being exposed outside by covering the cut surface as well as fill the gap 160.

The decoration unit 200 may be mounted so as to fill the gap 160 through a forward movement thereof from inside the door panel 100. The decoration unit 200 may first be mounted to the door panel 100, and may then be fixed thereto. In order to fix the decoration unit 200 more effectively, the upper surface panel 140 may include a reinforcement panel 150, which may be bent from the rear end of the upper surface panel 140 so as to face the front surface panel 110.

The length of the upper surface panel 140 in a forward-and-backward direction may be smaller than the length of the side surface panel 120 in the forward-and-backward direction. In other words, the length of the upper surface panel 140 in the forward-and-backward direction may be smaller than the thickness of the door panel, which is substantially defined by the length of the side surface panel 120 in the forward-and-backward direction.

The top surface of the door panel may be formed by the upper surface panel 140 and a control panel. In other words, the thickness of the door panel may be defined by the length of the side surface panel 120 in the forward-and-backward direction, or may also be defined by the sum of the length of the upper surface panel 140 in the forward-and-backward direction and the length of the control panel in the forward-and-backward direction. Because the gap 160 is smaller than the thickness of the door panel, it may not be easy to fill the gap 160 using a separate structure.

The reinforcement panel 150 may include a horizontal cut portion 155 and a vertical cut portion 156. The horizontal cut portion 155 and the vertical cut portion 156 may define a reinforcement panel opening 157 therebetween. The reinforcement panel opening 157 may allow the decoration unit 200 to be inserted therethrough. The decoration unit 200 may be inserted through the opening 157, and may then be located between the rear surface of the front surface panel 110 and the front surface of the reinforcement panel 150.

After being inserted, the decoration unit 200 may be stably fixed. If the decoration unit moves forwards, backwards, leftwards or rightwards or rotates, the gap 160 may not be sufficiently filled. Therefore, in order to solve this problem, the decoration unit 200 may have a structure such that it is capable of being fixed to the door panel 100, and the door panel 100 may have a structure such that it is capable of fixing the decoration unit.

The gap 160 may include a lateral gap portion between the upper surface panel 140 and the side surface panel 120 and a vertical gap portion between the upper surface panel 140 and the side surface panel 120, and these gap portions may need to be filled. To this end, the decoration unit 200 may include an exposed portion or protrusion 210. The exposed portion 210 may fill the gap at the outside of the door panel.

Figure 2:
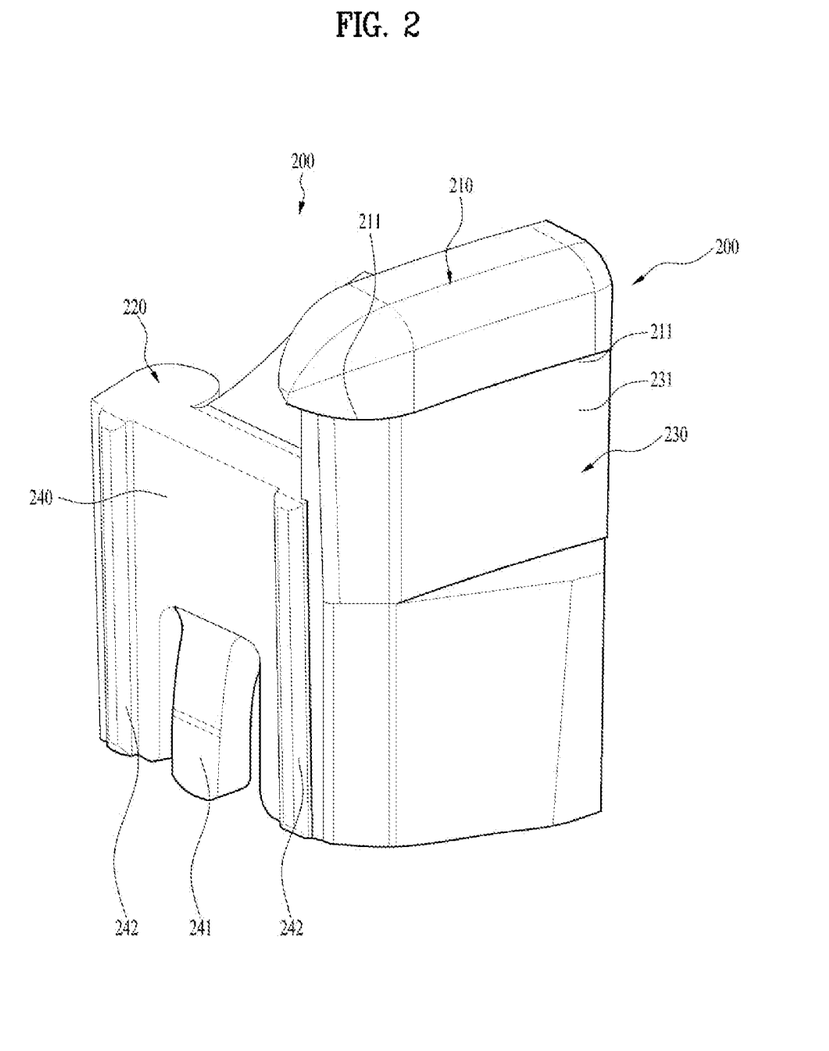
FIG. 2 illustrates a perspective view of the decoration unit shown in FIG. 1.

As shown in FIG. 2, the decoration unit 200 may include a side surface portion 230, which may contact the inner surface of the side surface panel, and a front surface portion 240, which may contact the inner surface of the front surface panel. The side surface portion 230 may include a support surface 231, which may be formed parallel to the inner surface of the side surface panel. The decoration unit 200 may be inserted in a manner such that the decoration unit 200 slides from the rear to the front while the support surface 231 is maintained in close contact with the inner surface of the side surface panel.

Each of the front surface panel 110 and the side surface panel 120 may have a predetermined thickness. It may not be desirable for the thickness portion, i.e. the cut surface, of each panel to be exposed outside. Therefore, the decoration unit 200 may include the exposed portion 210 so as to cover the thickness portion. The exposed portion 210 may include a stepped portion 211. Specifically, the stepped portion 211 may be formed between the exposed portion 210 and the side surface portion 230 and between the exposed portion 210 and the front surface portion 240.

Using this stepped portion 211, the exposed portion 210 may be capable of covering the thickness portion of the upper-end portion of the front surface panel 110 and the thickness portion of the upper-end portion of the side surface panel 120. In addition, the stepped portion 211 may prevent the inserted decoration unit 200 from being separated downwards. The exposed portion 210 may have a curved external appearance, and the stepped portion 211 may be formed at the bottom of the exposed portion 210.

The decoration unit 200 may include a top surface portion 220, which may be stepped from the exposed portion 210. The top surface portion 220 may be formed adjacent to the exposed portion 210. The top surface portion 220 may be formed at a position lower than the position of the exposed portion 210.

The top surface portion 220 may be formed so as to be inserted through the horizontal cut portion 155. The entire area of the top surface portion 220 may not be completely inserted through the horizontal cut portion 155.

Only a portion of the top surface portion 220 in the forward-and-backward direction may be inserted into a region between the front surface of the reinforcement panel and the rear surface of the front surface panel. Therefore, the top surface portion 220 and the horizontal cut portion 155 may be in contact with each other.

Figure 3:
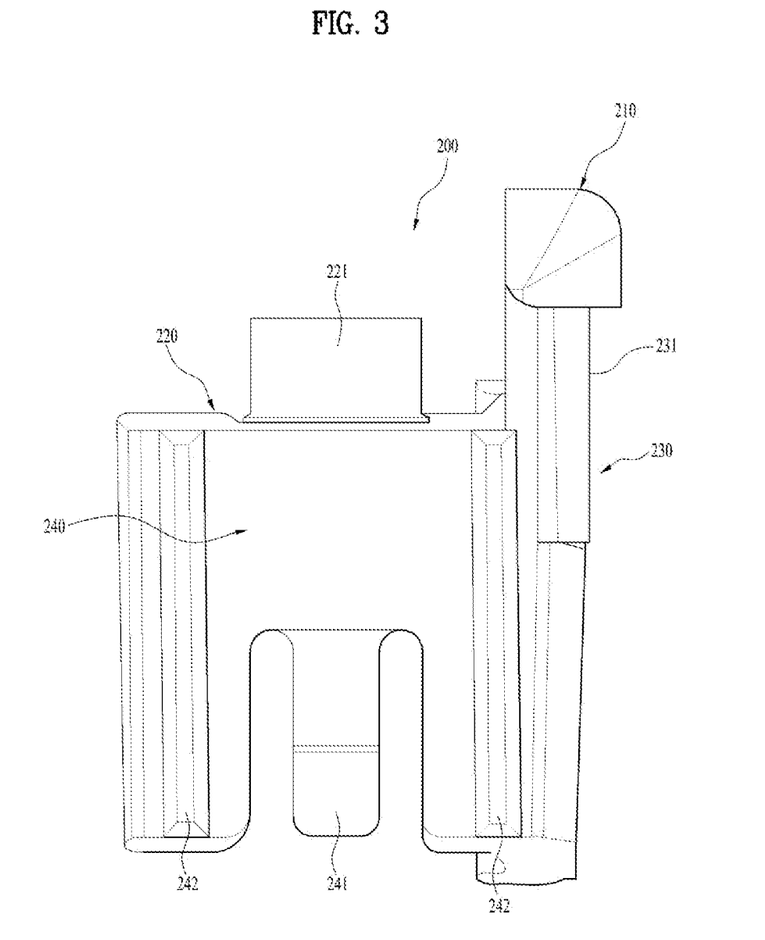
FIG. 3 illustrates a front view of the decoration unit shown in FIG. 1.
Figure 4:
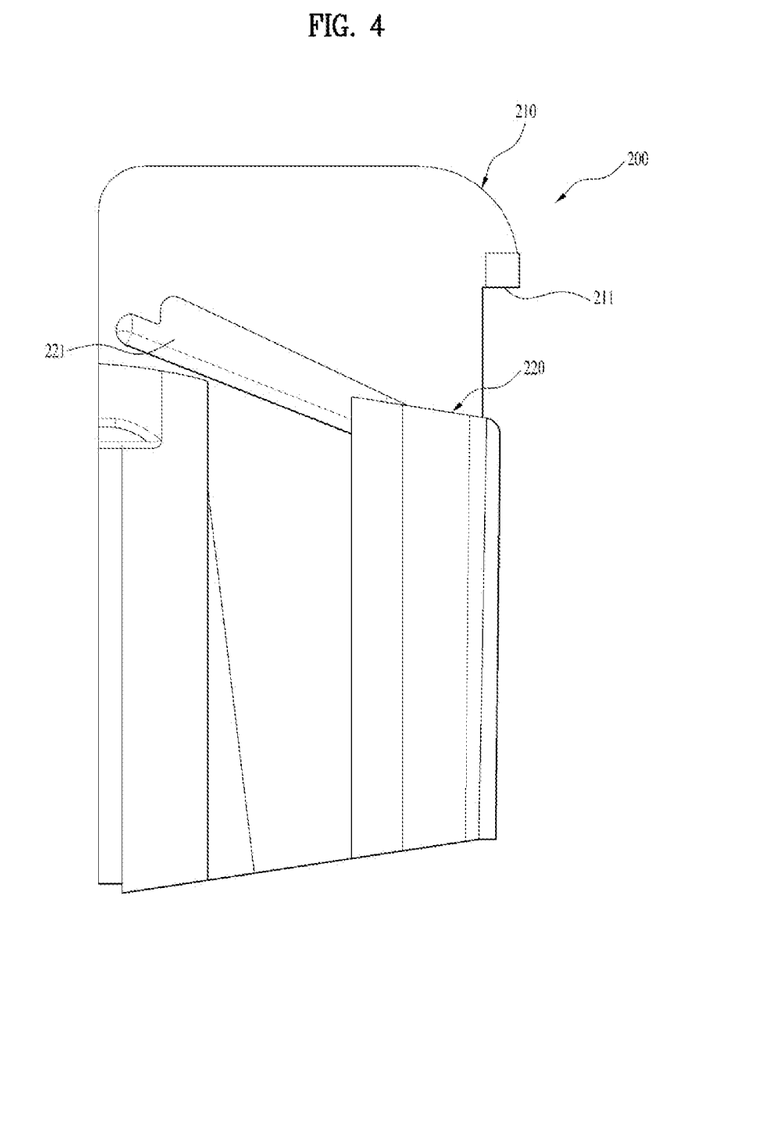
FIG. 4 illustrates a side view of the decoration unit shown in FIG. 1.
Figure 5:
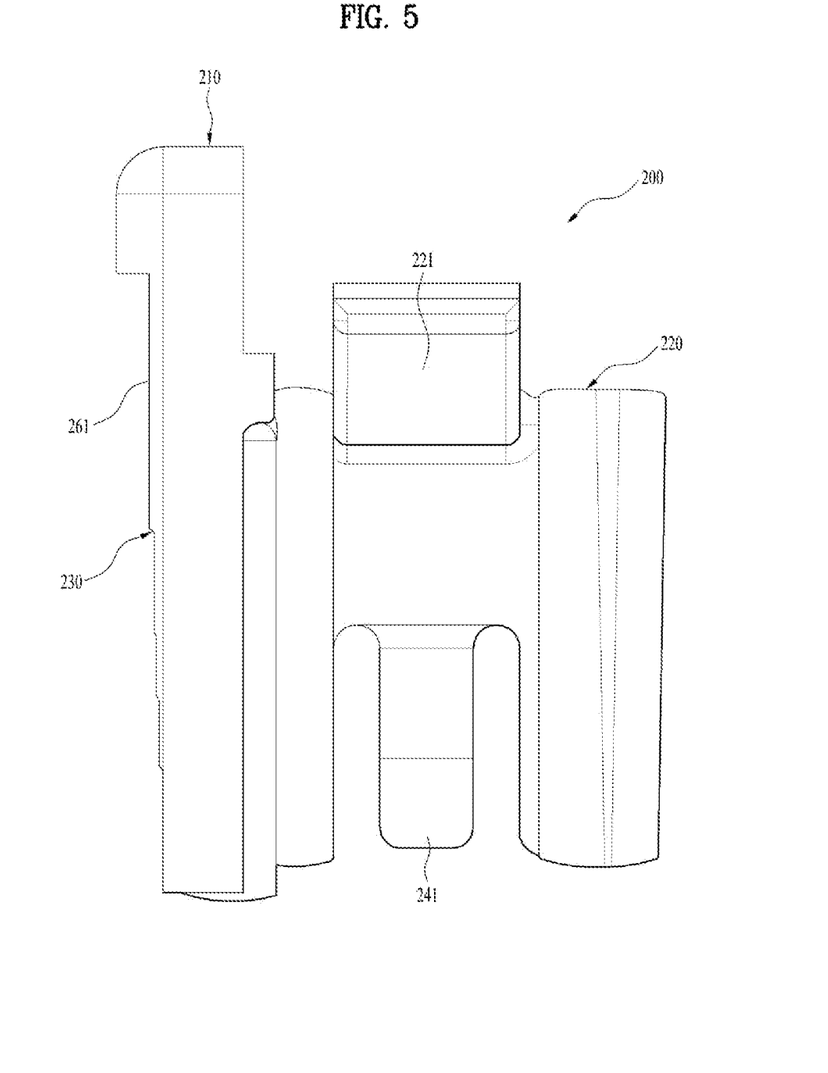
FIG. 5 illustrates a rear view of the decoration unit shown in FIG. 1.

As shown in FIG. 3, the decoration unit 200 may further include an elastic hook 221, which may be provided at the top surface portion 220. When the decoration unit 200 is inserted, the elastic hook 221 may be elastically deformed in the downward direction, and accordingly the elastic restoring force of the elastic hook 221 may be applied in a direction in which the upper surface panel is pushed. In reaction to the elastic restoring force of the elastic hook 221, which is applied to push the upper surface panel, a force that pushes the decoration unit 200 in the downward direction may be generated. However, the stepped portion of the exposed portion may prevent the decoration unit 200 from being pushed downwards.

The elastic hook 221 may include an insertion portion or tab 222, into which the distal end of the reinforcement panel may be inserted. The insertion portion may restrict the upward movement and backward movement of the decoration unit 200. A detailed description thereof will be made later.

The decoration unit 200 may further include an auxiliary hook (or flexible tab) 241, which may be provided at the bottom of the front surface portion 240. When the decoration unit 200 is inserted, the auxiliary hook 241 may contact a rear surface of the front surface panel, and accordingly the elastic restoring force of the auxiliary hook 241 may be applied in a direction such that the front surface panel is pushed. The elastic hook 221 and the auxiliary hook 241 may be formed at the middle of the decoration unit 200 in the leftward-and-rightward direction.

The elastic hook 221 may be provided at an upper portion of the decoration unit 200, and the auxiliary hook 241 may be provided at a lower portion of the decoration unit 200. The direction in which the elastic restoring force of the elastic hook 221 is applied and the direction in which the elastic restoring force of the auxiliary hook 241 is applied may be opposite each other. Accordingly, it may be possible to stably fix the decoration unit. A detailed description thereof will be made later.

The decoration unit 200 may further include step prevention ribs 242, which may be provided at the left and right marginal portions of the front surface portion 240 and may extend in the vertical direction. The step prevention ribs may protrude forwards from the front surface portion. Therefore, the front surface portion may contact the rear surface of the front surface panel through the step prevention ribs and the auxiliary hook. Using this structure of the step prevention ribs, the front surface portion may be maintained in close contact with the front surface panel.

A reinforcement panel 130 may be bent from the rear end of the side surface panel 120 so as to face the front surface panel 110. Specifically, the aforementioned door panel may be a front panel of the door. Therefore, a rear panel of the door may be engaged with the reinforcement panel 130. Unlike the front panel, the rear panel may be formed through an injection-molding process.

The aforementioned door panel may be a door panel of a home appliance, and specifically, may be a door panel of a dishwasher, and may be provided at the front portion of the dishwasher. Therefore, the aesthetic external appearance of the door panel may be very important. For this reason, the decoration unit according to the embodiment may be used in order to fill the gap that is exposed outside.

The decoration unit may be formed so as to have a texture and a color that are the same as or similar to those of the door panel. Accordingly, it may be possible to exhibit an excellent overall appearance.

Figure 6:
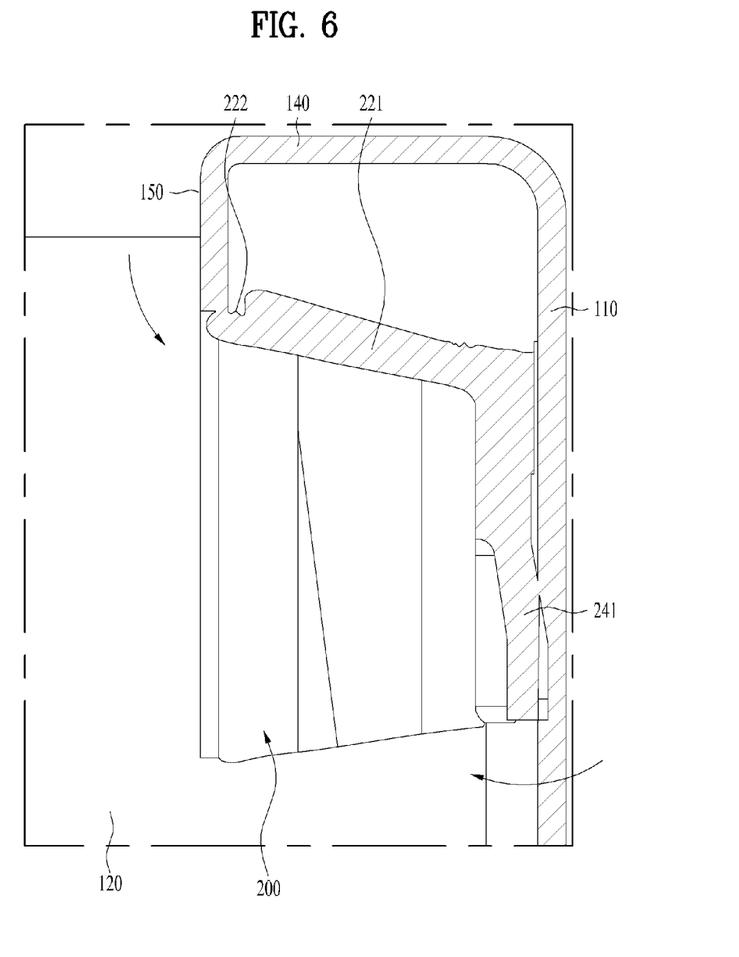
FIG. 6 illustrates the sectional shape of the door panel into which the decoration unit shown in FIG. 1 has been completely inserted.

As shown in FIG. 6, the elastic restoring force of the elastic hook 221 and the elastic restoring force of the auxiliary hook 241 may be applied in different directions at different positions from each other. Therefore, the decoration unit 200 may be prevented from rotating clockwise or counterclockwise in FIG. 6. As such, because even small movement of the decoration unit is restricted, it may be possible to prevent any exposure of the gap 160.

The elastic hook 221 may have an additional function. Described in detail, the distal end of the horizontal cut portion 155 may be inserted into the insertion portion 222 formed in the elastic hook 221. Therefore, when the decoration unit 200 receives a force of pushing the insertion portion 222 upwards, upward movement of the decoration unit 200 may be prevented by the insertion portion 222 being caught by the horizontal cut portion 155. In addition, when the decoration unit 200 receives a force of pushing the decoration unit 200 backwards, backward movement of the decoration unit 200 may be prevented by catching of the insertion portion 222 by the horizontal cut portion 155.

This embodiment provides the decoration unit 200, which may be capable of effectively filling a relatively small gap, for example, having a length of about 10 mm in the forward-and-backward direction, and the door panel including the same. Further, the decoration unit 200 according to this embodiment may be configured to be easily guided to a position to fill the gap. The decoration unit 200 may be slid from a rear to a front of the door panel while the stepped portion formed at the bottom of the exposed portion is maintained in contact with the thickness portion of the upper end of the side surface panel and the support surface of the side surface portion is maintained in contact with the inner surface of the side surface panel.

As such, the decoration unit 200 may be capable of being stably and securely inserted into the gap in the correct direction. Therefore, it may be possible to fill the gap very easily and effectively. In addition, it may be possible to cover all of the cut surfaces of the panels that form the gap using the decoration unit 200.

As is apparent from the above description, the present disclosure provides a decoration unit, which may be capable of being mounted to a door panel at the inside of the door panel, and a door panel including the same. In addition, the present disclosure provides a door panel that may be capable of preventing the movement of a decoration unit inserted thereinto.

In addition, the present disclosure provides a decoration unit, which may be capable of effectively and stably filling a gap even when the gap is small, and a door panel including the same. In addition, the present disclosure provides a door panel having an improved structure for receiving a decoration unit inserted thereinto, to thereby ensure firm engagement between the door panel and the decoration unit.

In addition, the present disclosure provides a door panel that may enable a decoration unit to be easily and accurately mounted at a desired position. In addition, the present disclosure provides a decoration unit, which may be easily manufactured through plastic injection molding, and a door panel including the same. Therefore, it may be possible to fill a gap, which is generated at an edge portion of a door panel by bending the door panel, without welding the gap.

In addition, it may be possible to cover cut surfaces of a door panel, which are exposed from an edge portion formed by bending the door panel, using a decoration unit. Therefore, it may be possible to effectively prevent the cut surfaces from being exposed outside the door panel.

A door panel for a home appliance may include a front surface panel, a side surface panel bent from a side of the front surface panel, an upper surface panel bent from a top of the front surface panel, the upper surface panel being provided above an upper end of the side surface panel, a gap formed at an edge portion between the upper end of the side surface panel and a side end of the upper surface panel, and a decoration piece configured to fill the gap through a forward movement thereof along an inner surface of the side surface panel, wherein the decoration piece includes an exposed portion configured to compensate for a difference in height between the upper end of the side surface panel and the upper surface panel, a side surface portion configured to closely contact the inner surface of the side surface panel, and a front surface portion configured to closely contact an inner surface of the front surface panel.

The exposed portion may be configured to fill a lateral gap between the upper surface panel and the side surface panel. The gap may include a vertical gap and a lateral gap, and the decoration piece may be formed so as to fill this gap.

The decoration piece may be formed as a unitary body, and may be inserted into the door panel so as to fill a gap formed at an edge of the door panel. The decoration piece may be configured to be fixedly inserted into the door panel. The door panel may be formed through processes of cutting and bending a single piece of panel.

The upper surface panel may include a reinforcement panel bent from a rear end of the upper surface panel so as to face the front surface panel. The upper surface panel may have a length in the forward-and-backward direction that is smaller than a length of the side surface panel in the forward-and-backward direction. Therefore, the gap may be very small. Accordingly, the decoration piece may be inserted into the door panel in the direction from the inside to the outside.

The reinforcement panel may include a horizontal cut portion and a vertical cut portion, and the horizontal cut portion and the vertical cut portion may define a reinforcement panel opening therebetween. The decoration piece may be inserted between a front surface of the reinforcement panel and a rear surface of the front surface panel through the reinforcement panel opening.

The decoration piece may further include a top surface portion formed so as to be stepped from the exposed portion and to be inserted through the horizontal cut portion. The decoration piece may further include an elastic hook provided at the top surface portion, and when the decoration piece is inserted, the elastic hook may be elastically deformed in a downward direction so that an elastic restoring force of the elastic hook is applied in a direction of pushing the upper surface panel.

The elastic hook may have therein an insertion portion formed to receive a distal end of the reinforcement panel inserted thereinto, and the insertion portion may restrict upward movement and backward movement of the decoration piece. Only a portion of an entire length of the top surface portion in the forward-and-backward direction may be inserted between the front surface of the reinforcement panel and the rear surface of the front surface panel such that the top surface portion and the horizontal cut portion contact each other.

The decoration piece may further include an auxiliary hook provided at a bottom of the front surface portion, and the auxiliary hook may be configured to closely contact the rear surface of the front surface panel so that an elastic restoring force of the auxiliary hook is applied in a direction of pushing the front surface panel. Therefore, the decoration piece may contact the panels at a plurality of contact positions. The movement of the decoration piece may be restricted through at least two elastic support points.

Further, the backward separation and the upward separation of the decoration piece may be prevented by the elastic hook. If the close contact between the exposed portion and the gap is released, the aesthetic appearance of the door panel may be deteriorated. This problem may be securely prevented by the decoration piece.

A stepped portion that compensates for a thickness of the front surface panel may be formed between the exposed portion and the front surface portion, and a stepped portion that compensates for a thickness of the side surface panel may be formed between the exposed portion and the side surface portion. Therefore, the thickness portion may be prevented from being exposed outside.

The decoration piece may further include step prevention ribs that prevent the decoration piece from rotating from side to side, and the step prevention ribs may be provided at left and right marginal portions of the front surface portion and may extend in a vertical direction. The side surface portion may include a support surface formed parallel to the inner surface of the side surface panel, and the decoration piece may fill the gap through sliding movement thereof in a forward direction when the support surface and the side surface panel are in contact with each other.

The side surface panel may include a reinforcement panel bent from a rear end of the side surface panel so as to face the front surface panel. The door panel may be a front panel that forms a front surface of a door for a home appliance. The home appliance may be a dishwasher.

A door panel for a home appliance may include a front surface panel, a side surface panel bent from a side of the front surface panel, an upper surface panel bent from a top of the front surface panel, the upper surface panel being provided above an upper end of the side surface panel and including a reinforcement panel bent from a rear end of the upper surface panel so as to face the front surface panel, a gap formed at an edge portion between the upper end of the side surface panel and a side end of the upper surface panel, and a decoration piece configured to fill the gap through forward movement thereof along an inner surface of the side surface panel, wherein the decoration piece includes an exposed portion configured to compensate for a difference in height between the upper end of the side surface panel and the upper surface panel, a side surface portion configured to closely contact the inner surface of the side surface panel, a front surface portion configured to closely contact an inner surface of the front surface panel, a top surface portion formed so as to be stepped from the exposed portion in a vertical direction, and an elastic hook provided at the top surface portion, the elastic hook restricting backward movement of the decoration piece through contact with a lower end of the reinforcement panel and restricting upward movement of the decoration piece using an elastic restoring force thereof.

The decoration piece may further include an auxiliary hook provided at a bottom of the front surface portion, and the auxiliary hook may be configured to closely contact the front surface panel so that an elastic restoring force of the auxiliary hook is applied to the front surface panel. The elastic restoring force of the elastic hook and the elastic restoring force of the auxiliary hook may be applied in directions opposite each other.

A stepped portion that compensates for a thickness of the front surface panel may be formed between the exposed portion and the front surface portion, and a stepped portion that compensates for a thickness of the side surface panel may be formed between the exposed portion and the side surface portion. The reinforcement panel may include a horizontal cut portion and a vertical cut portion, and the horizontal cut portion and the vertical cut portion may define a reinforcement panel opening therebetween. The decoration piece may be inserted between a front surface of the reinforcement panel and a rear surface of the front surface panel through the reinforcement panel opening.

It is to be understood that both the foregoing general description and the following detailed description of the present invention are exemplary and explanatory and are intended to provide further explanation of the invention as claimed.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A door panel for a home appliance comprising:
   a front surface panel;
   a side surface panel bent from a side of the front surface panel in a first direction;
   an upper surface panel bent from a top of the front surface panel in the first direction, wherein a top of the upper surface panel is located higher than an upper end of the side surface panel, and a gap is formed at an edge portion between the upper end of the side surface panel and a side end of the upper surface panel;
   a reinforcement panel bent in a second direction perpendicular to the first direction from a rear end of the upper surface panel so as to face the front surface panel, the reinforcement panel including a reinforcement panel opening; and
   a decorative piece configured to fill the gap and to be inserted through the reinforcement panel opening, wherein the decorative piece includes:
      an exposed protrusion configured to compensate for a difference in height between the upper end of the side surface panel and the upper surface panel;
      a side configured to contact the inner surface of the side surface panel;
      a front configured to contact an inner surface of the front surface panel; and
      an elastic hook having an insertion tab, wherein, when the decorative piece is inserted into the reinforcement panel opening, the elastic hook is elastically deformed such that an elastic restoring force of the elastic hook pushes against the reinforcement panel, and wherein the insertion tab is formed to communicate with a distal end of the reinforcement panel and to restrict a movement of the decorative piece.

2. The door panel according to claim 1, wherein a length of the upper surface panel in the first direction is smaller than a length of the side surface panel in the first direction.

3. The door panel according to claim 1, wherein the decorative piece further includes a top stepped from the exposed protrusion and configured to be inserted through the reinforcement panel opening.

4. The door panel according to claim 1, wherein the elastic hook is provided at a top surface such that, when the decorative piece is inserted into the reinforcement panel opening, the elastic hook is elastically deformed in a downward direction such that the elastic restoring force of the elastic hook pushes up against the reinforcement panel.

5. The door panel according to claim 1, wherein the insertion tab is configured to restrict upward movement and backward movement of the decorative piece.

6. The door panel according to claim 1, wherein a portion of an entire length of the top in the first direction is inserted into the reinforcement panel opening such that the top contacts a distal end of the reinforcement panel.

7. The door panel according to claim 1, wherein the decorative piece further includes a flexible tab provided at a bottom of the front, the flexible tab being configured to contact the rear surface of the front surface panel such that an elastic restoring force of the flexible tab pushes against the front surface panel.

8. The door panel according to claim 1, wherein the exposed protrusion is stepped outward from the front and outward from the side to compensate for a thickness of the side surface panel and a thickness of the front surface panel.

9. The door panel according to claim 8, wherein the decorative piece further includes step prevention ribs configured to prevent the decorative piece from rotating, the step prevention ribs being provided at left and right marginal portions of the front and extending in a vertical direction.

10. The door panel according to claim 8, wherein the side includes a support surface formed parallel to the inner surface of the side surface panel, and wherein the decorative piece fills the gap by sliding toward the front surface panel when the support surface and the side surface panel are in contact with each other.

11. The door panel according to claim 8, wherein the side surface panel includes a reinforcement panel bent from a rear end of the side surface panel so as to face the front surface panel.

12. The door panel according to any claim 11, wherein the door panel is a front panel of a door for a home appliance.

13. The door panel according to claim 12, wherein the home appliance is a dishwasher.

14. A door panel for a home appliance, comprising:
a front surface panel;
a side surface panel bent from a side of the front surface panel in a first direction;
an upper surface panel bent from a top of the front surface panel in the first direction, wherein a top of the upper surface panel is located higher than an upper end of the side surface panel and includes a reinforcement panel bent from a rear end of the upper surface panel so as to face the front surface panel, and wherein a gap is formed at an edge portion between the upper end of the side surface panel and a side end of the upper surface panel; and
a decorative piece configured to fill the gap, wherein the decorative piece includes:
an exposed protrusion configured to compensate for a difference in height between the upper end of the side surface panel and the upper surface panel;
a side configured to contact the inner surface of the side surface panel;
a front configured to contact an inner surface of the front surface panel;
a top stepped from the exposed protrusion in a vertical direction; and
an elastic hook provided at the top, the elastic hook configured to restrict movement of the decorative piece in a first direction through contact with a lower end of the reinforcement panel and restricting movement of the decorative piece in a second direction perpendicular to the first direction by using an elastic restoring force,
wherein the decorative piece further includes a flexible tab provided at a bottom of the front, the flexible tab being configured to contact the front surface panel so that an elastic restoring force of the flexible tab is applied to the front surface panel, and wherein the elastic restoring force of the elastic hook and the elastic restoring force of the flexible tab are applied in directions opposite each other.

15. The door panel according to claim 14, wherein the exposed protrusion is stepped outward from the front and outward from the side to compensate for a thickness of the side surface panel and a thickness of the front surface panel.

16. The door panel according to claim 15, wherein the step formed between the exposed protrusion and the front covers a cut surface of the front surface panel, and the step formed between the exposed protrusion and the side covers a cut surface of the side surface panel.

17. The door panel according to claim 14, wherein the reinforcement panel includes a reinforcement panel opening, and wherein the decorative piece is inserted through the reinforcement panel opening.

18. A door panel for a home appliance comprising:
a front panel;
a side panel bent from a side of the front panel;
an upper panel bent from a top of the front panel;
a reinforcement panel bent from the upper panel so as to face the front panel, the reinforcement panel including an opening; and
a decorative piece, including:
an exposed protrusion configured to fill a gap between the upper panel and the side panel;
a top surface stepped from the exposed protrusion and configured to be inserted through the opening;
a side configured to contact the side panel;
a front configured to contact the front panel; and
an elastic hook inclined upward from the top surface so as to be elastically deformed downward when inserted into the opening, the elastic hook having:
an insertion tab configured to be inserted under an end of the reinforcement panel to restrict a movement of the decorative piece; and
a flexible tab configured to contact the front surface panel so that an elastic restoring force of the flexible tab is applied to the front surface panel.

* * * * *